UNITED STATES PATENT OFFICE.

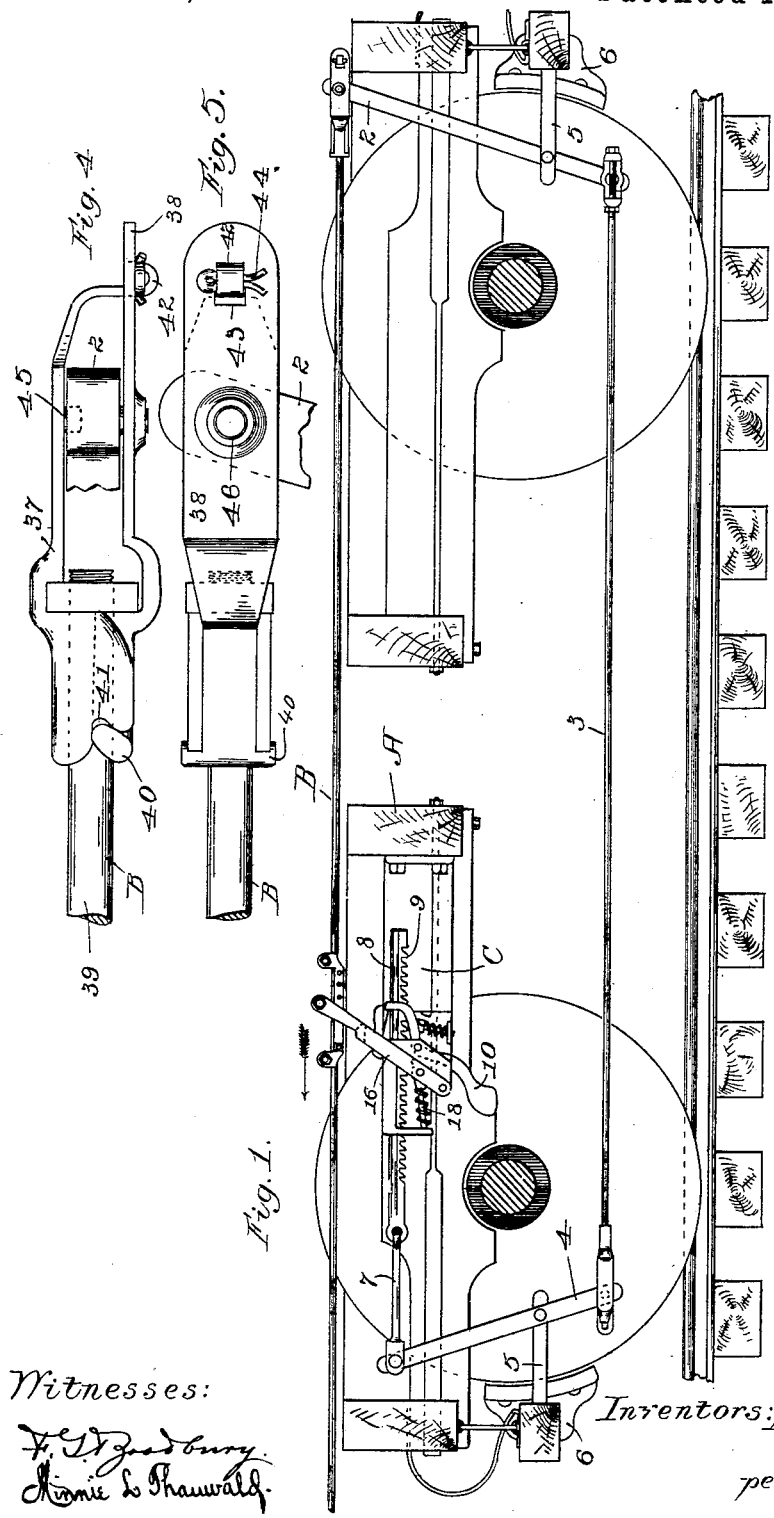

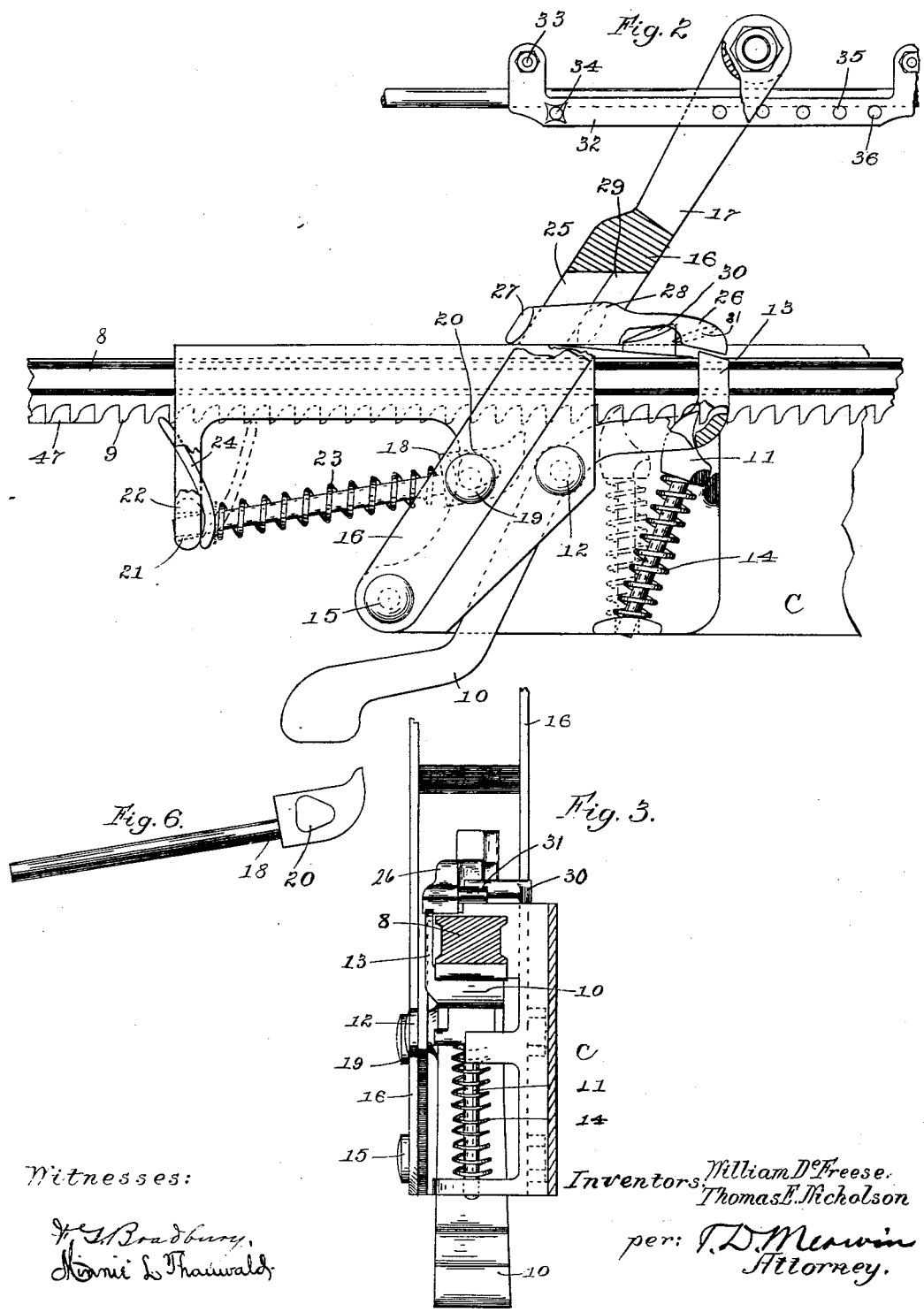

THOMAS ERNEST NICHOLSON AND WILLIAM DE FREESE, OF ST. PAUL, MINNESOTA.

AUTOMATIC SLACK-ADJUSTER FOR RAILWAY-BRAKES.

SPECIFICATION forming part of Letters Patent No. 593,553, dated November 9, 1897.

Application filed December 11, 1896. Serial No. 615,365. (No model.)

*To all whom it may concern:*

Be it known that we, THOMAS ERNEST NICHOLSON and WILLIAM DE FREESE, of St. Paul, Ramsey county, Minnesota, have invented certain Improvements in Automatic Slack-Adjusters for Railway-Brakes, of which the following is a specification.

Our invention relates to improvements in slack-adjusters, its object being to provide an apparatus designed to automatically take up all the slack in the brake mechanism caused by wear of the brake-shoes and also to automatically give slack when the shoes become too tight, so as to maintain a substantially uniform travel of the piston in the brake-cylinder.

We also provide other improved features of construction, hereinafter more particularly described and claimed.

In the accompanying drawings, forming part of this specification, Figure 1 is a side elevation of our improvement shown applied to a car-truck. Fig. 2 is a partial side elevation of the same detached. Fig. 3 is a sectional end view of Fig. 2. Figs. 4 and 5 are details of a form of coupling used in connection with our invention, and Fig. 6 is a detail of the rack-actuating dog.

In the drawings, B represents the ordinary brake-rod, connected at one end with the piston in the brake-cylinder and at its other end with the live brake-lever 2, which is connected by a link 3 with the dead brake-lever 4. The brake-levers 2 and 4 are connected by links 5 with the brake-shoes 6. The upper end of the dead brake-lever 4 is pivotally connected, by means of a rod 7, with the toothed rack or bar 8, longitudinally slidable in the casing C, which is suitably attached to the truck-timbers A. The teeth 9 upon the under side of the bar 8 are engaged by a gravity-dog 10 and a spring-controlled dog 11. The gravity-dog 10 has a fulcrum 12 in the casing and is provided with the spur 13, projecting above the top of the bar 8, for the purposes hereinafter more particularly described. The dog 11 is provided with a spring 14, by means of which it is held in engagement with the rack and is adapted to control the rack when the gravity-dog 10 has been released therefrom in the operation of the apparatus. Having fulcrum connection 15 in the casing is the lever 16, the free end of which is provided with a slot 17, through which the brake-rod passes. The rack 8 is adapted to be moved forward in its bearings in the operation of the apparatus by means of a dog 18, fulcrumed in the lever by a pin 19, passing through a triangular opening 20 in the head of the dog, this opening being for the purpose of giving the dog sufficient play in the actuating of the lever 16. The stem of the dog 18 slides through an opening 21 in the downwardly-projecting end 22 of the casing and is surrounded by a coil-spring 23, by means of which the lever 16 is held in the position shown in Fig. 2.

24 represents a pawl engaging with the rack 8 in the rear of the lever 16 and actuated by the spring 23 bearing against it. Arranged in an opening 25 through the lever 16 immediately above the top of the casing is a pawl 26, held therein by means of the spurs 27, abutting against the forward side of the lever, and by spurs 28, abutting against the wall of the groove 29 in the rear of the opening 25. Secured in the end of the pawl is the lug 31, working in connection with a right-angled trip 30 upon the top of the casing.

In order to provide for the actuating of the lever by the travel of the brake-rod, we secure upon the rod the clamp-collar 32, held in place thereon by bolts 33. This collar is formed at one end with the lateral spurs 34 and at its other end with the apertures 35, in one of which is adapted to be placed a pin 36 to engage the lever in setting the brakes.

In Figs. 4 and 5 is shown a form of coupling used in connection with our invention, the same being shown in Fig. 1 connecting the link 3 and the brake-rod B with the brake-levers. This coupling consists of the members 37 and 38, the brake or other rod B to be adjusted being secured in one end of the member 37. The hinge member 38 is formed at one end with the gudgeon or pintle 40, adapted to be placed in the notch 41 in the end of the member 37, the hinge member when so secured being turned down, as shown, with the catch 42 upon the opposite end of the member 37 projecting through the opening 43 in the hinge member, in which position the members may be held together by a key 44. The member 37 is provided with a pin 45, serving as a pivot for the end of the brake-lever 2 or similar part, the hinge member of the coupling being formed with an opening 46, fitting over said pin when the members are closed.

The operation of our invention is as follows: In the drawings the parts are shown in normal position with the brake-shoes out of contact with the wheels. When it is desired to apply the brakes, a pull is exerted on the brake-rod in the direction of the arrow. The parts are so adjusted that if no slack exists the pull upon the brake-rod will actuate the lever 16 (by means of the engagement of the pin 36 with the lever) sufficiently to carry the lug 31 underneath and immediately to the rear of the trip 30. This movement of the lever will not carry the dog 18 back a sufficient distance to engage the rack, so that when the brakes are released the lever will return to normal position without interfering with the position of the rack, the lug 31 sliding over the top of the trip 30, and thus not coming in contact with the spur 13 of the gravity-dog. When, however, by reason of wear of the brake-shoes or by settling of the shoes by a heavy load upon the car slack exists, the piston in the brake-cylinder will have to travel beyond its normal stroke, thus pulling the brake-rod a greater distance to properly apply the brakes. This will cause the lever 16 to be turned on its fulcrum a greater distance by means of the brake-rod and sufficiently to bring the dog 18 into engagement with the teeth of the rack. As soon as the brakes are released the spring 23 upon the dog 18 will force the lever 16 back into normal position and also move the rack 8 forward by reason of the engagement of the dog with the rack-teeth. By this movement of the rack any existing slack will be taken up by reason of the pull of the rack upon the dead brake-lever 4. As the lever 16 in this operation is returned to normal position on the releasing of the brakes the lug 31 will slide over the trip 30, preventing engagement of the pawl with the spur 13 of the gravity-dog 10. When the brakes become too tight for any reason, slack may be given as follows: There will then be a shorter travel of the brake-rod necessary to apply the brakes, so that the lever 16 will only be moved enough to carry the free end of the pawl 26 to the rear of the projecting end 13 of the gravity-dog, with the lug 31 of the pawl 26 underneath the trip 30. When the brakes are released and the spring 23 forces the lever 16 back into its normal position, the free end of the pawl will be carried into engagement with the end 13 of the gravity-dog, freeing said dog from the rack. The pull of the brake-levers and the pressure of the pawl 24 upon the rack will then pull said rack, as illustrated by the dotted-line position of the dog 14, the gravity-dog again engaging the teeth of the rack. If this should happen to give too much slack, the next setting of the brakes would take up as many notches as necessary, as above described. The bar 8 is provided with a sufficient number of teeth to take up all of the slack until the brake-shoes are completely worn out, and in order to avoid further movement of the rack, so as to break any of the parts, we form the end of the rack-bar 8, which is connected with the dead brake-lever, with a plane-surfaced portion 47, which serves as a stop. Thus when such an amount of slack is taken up as to bring the dog 18 to the end of the portion 47 the lever 16 will be actuated without further moving the rack.

It will thus be evident that our invention will not only take up any existing slack, but will also give out slack when the brake-shoes are too tight, avoiding the necessity of any personal attention until the shoes are worn out. If it is desired, however, to give any slack without applying the brakes, this may be done by hand by turning the gravity-dog 10 to release the rack, and also slack may be similarly taken up by means of the adjustable connections between the rods B and 3 and the brake-levers.

We claim—

1. In combination with the brake rod and shoes, the mechanism actuated by the brake-rod to take up any slack, and the means actuated from said brake-rod for releasing the slack-take-up mechanism to give more slack.

2. The combination with the brake rod and shoes, and the slack-take-up mechanism connected with said shoes and operated from the brake-rod, of the means actuated from said brake-rod when the brake-shoes are too tight to release said slack-take-up mechanism and give a predetermined amount of slack.

3. A device of the class described, comprising a toothed bar sliding in suitable bearings, and adjustably connected with the dead brake-lever, the lever controlled from the brake-rod, and adapted to actuate said bar to take up any existing slack, and also adapted to be actuated from the brake-rod when the brake-shoes are too tight to release the bar and give a predetermined amount of slack.

4. An apparatus of the class described, comprising a toothed bar sliding in suitable bearings, and connected with the brake-levers, a lever controlled from the brake-rod, and adapted to actuate said bar as the brake-shoes are set to take up slack, and the means actuated by said lever to release said bar and let out slack when the brake-shoes are too tight.

5. The combination with a toothed bar sliding in suitable bearings and connected with the brake-levers, the dog engaging said bar and holding it in position, and the lever actuated from the brake-rod to cause travel of the bar to take up any existing slack, of the means actuated by said lever when the same is moved a predetermined distance to release the rack from its controlling-dog, and allow travel in the opposite direction.

6. In combination, the rack slidable in suitable supports and connected with the brake-levers, the dog for holding the rack in position, the lever actuated from the brake-rod and adapted when moved beyond a certain limit to engage and cause the travel of the rack in one direction, and the means actuated by said lever when the same is moved through a predetermined limit to release said rack, and allow it to travel in the opposite direction.

7. In a coupling of the class described, the combination of the member connected to the rod, and having a transverse gudgeon or pivot for the lever, the member having lateral lugs engaging corresponding notches in the first member, and turning in the same as a hinge, and having means for connecting its free end to the adjacent end of the other member, to lock them together, and secure said lever on said gudgeon.

8. In a coupling of the class described, the combination with the connecting-rod and brake-lever, of the coupling members, the one having lateral lugs and the other notches to be engaged by said lugs to form a detachable hinge connection, the means for adjustably securing the rod to one member, the transverse gudgeon or pivot for the brake-lever carried by one member and adapted to enter a socket in the other when they are closed together, and their interlocking connection.

In testimony whereof we affix our signatures in presence of two witnesses.

THOMAS ERNEST NICHOLSON.
WILLIAM DE FREESE.

Witnesses:
JOSEPH NICHOLSON,
H. S. JOHNSON.